Sept. 9, 1930.   R. A. NORLING   1,775,406
REVERSIBLE CLOSE QUARTER DRILL
Filed April 20, 1929   3 Sheets-Sheet 2
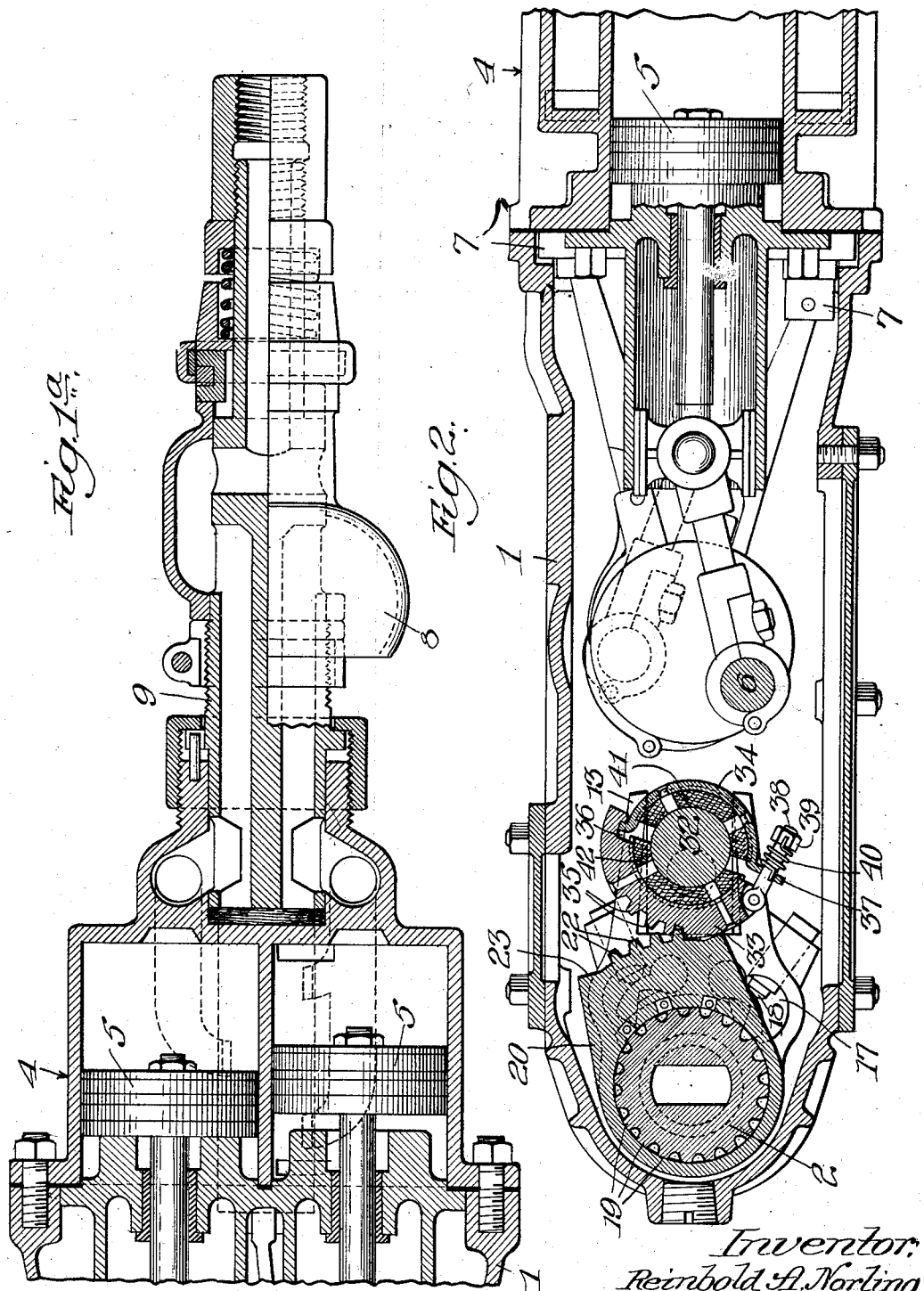
Inventor:
Reinbold A. Norling,
By [signature]
Atty.

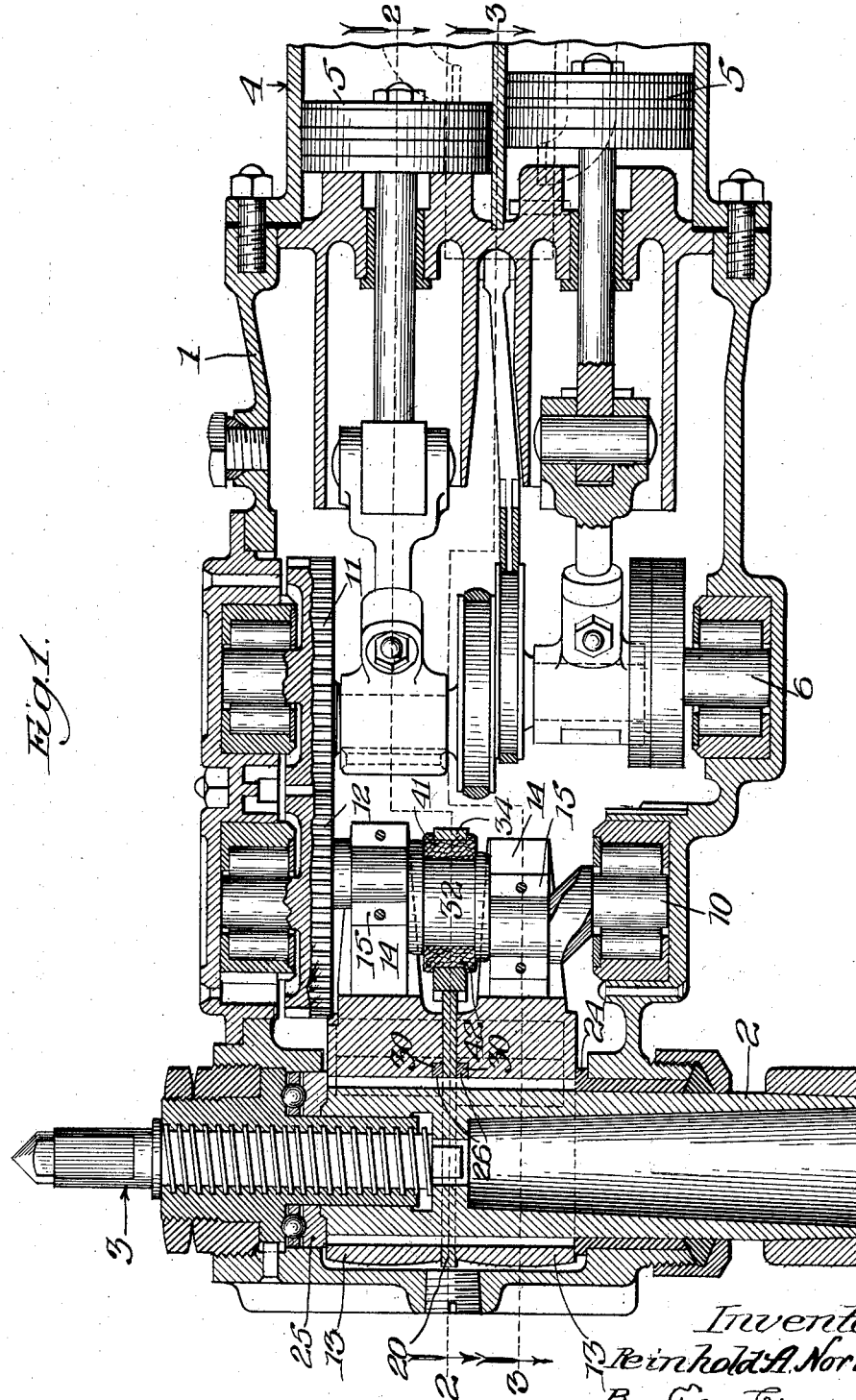

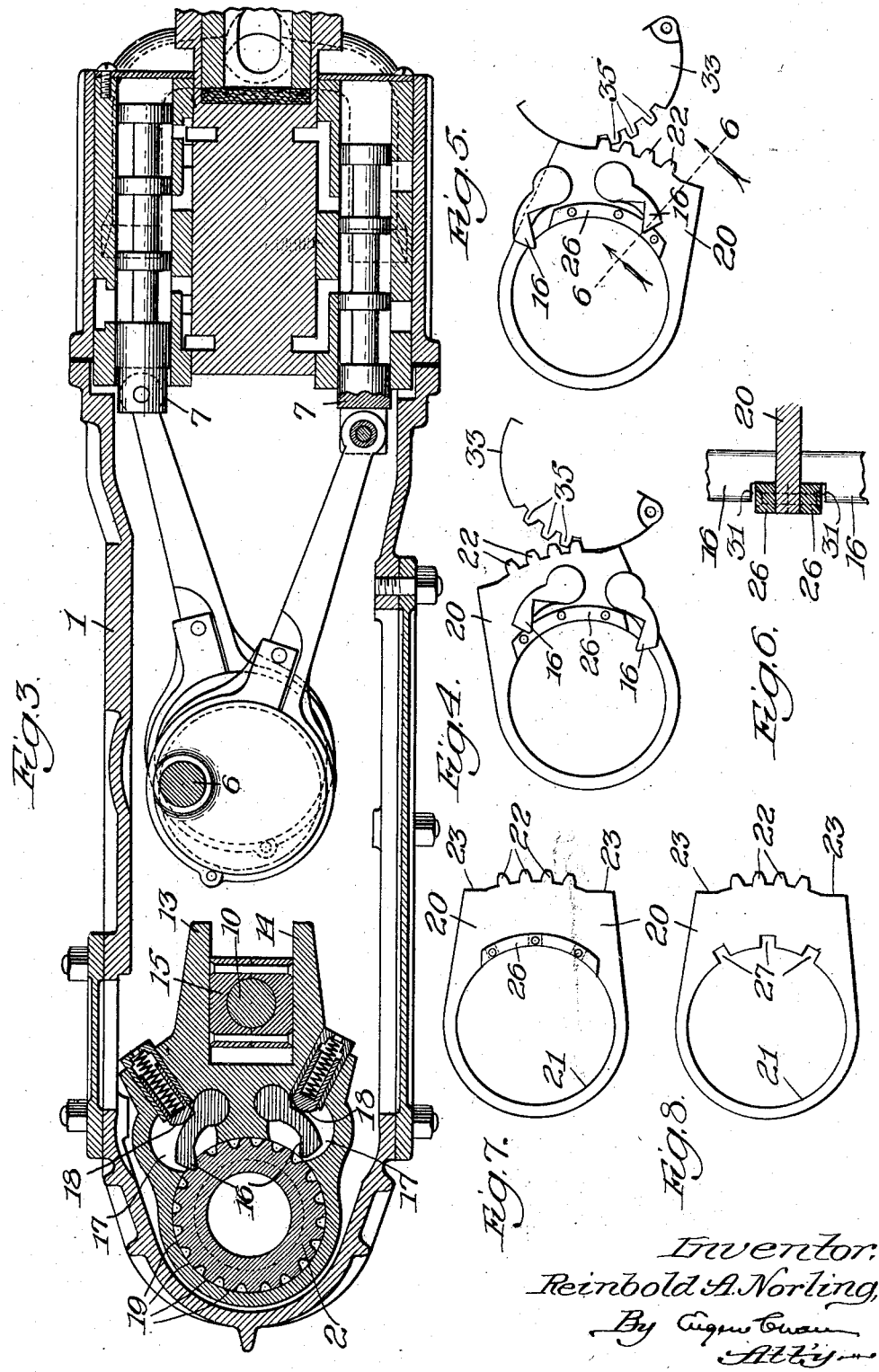

Patented Sept. 9, 1930

1,775,406

UNITED STATES PATENT OFFICE

REINHOLD A. NORLING, OF AURORA, ILLINOIS, ASSIGNOR TO INDEPENDENT PNEUMATIC TOOL COMPANY, OF CHICAGO, ILLINOIS, A CORPORATION OF DELAWARE

REVERSIBLE CLOSE-QUARTER DRILL

Application filed April 20, 1929. Serial No. 356,703.

This invention relates to improvements in portable power operated close quarter drills, such as are designed for use in angles and between adjacent walls and structural members.

In these drills, the spindle of each drill has rotary movement imparted thereto by a lever and pawl arrangement, the pawls being carried by the levers and acting on ratchet teeth on the spindle to turn the same. To rotate the spindle in opposite directions, reversely arranged pawls are used, one set for turning the spindle in one direction and the other set for turning the spindle in the opposite direction.

In accordance with my present invention, I provide means associated with the pawls for alternately lifting and holding them out of driving engagement with the teeth of the spindle on reversing the direction of rotation of the motor of the drill so that only the pawls of the set required for turning the spindle in the desired direction will be allowed to operate.

In carrying out this object, I provide a novel form of automatically operated pawl shifting and lifting means which is compact, as well as simple in construction, and which will not add to the overall dimension of the drill to increase it beyond the size required for close quarter use.

More specifically, I provide cam means for shifting the pawls and friction operated means on a crank shaft of the drill to automatically shift the cam means as the shaft changes it direction of rotation on being reversed.

I also provide means for adjusting the friction so as to take up the wear and thus enable the parts to be always in condition to operate.

The invention consists further in the matters hereinafter described and claimed.

In the accompanying drawings—

Figs. 1 and 1ª are a combined longitudinal sectional view taken through a close quarter drill embodying the features of my invention.

Figs. 2 and 3 are similar sectional views taken on lines 2—2 and 3—3, respectively of Fig. 1;

Figs. 4 and 5 are views showing how the cams alternately lift and hold the pawls out of driving engagement with the spinlde;

Fig. 6 is sectional view taken on line 6—6 of Fig. 5; and

Figs. 7 and 8 are face views of the shifter plate, one with the cams on the same and the other with the cams off.

In Figs. 1 to 3, 1 indicates the elongated main outer casing of the drill, and 2 indicates the drill spindle which is journaled in the casing 1 at one end thereof, and extends transversely across the same. The spindle 2 extends beyond one side of the casing and may be fed toward and from the work by a feed screw assembly 3 which is mounted in the casing at the other end of the spindle. The opposite end of the spindle is made hollow and tapered to accommodate the drill bit with which the work is performed.

The spindle 2 is rotated through the medium of a reversible motor 4 which is secured to the casing 1 at its end opposite the spindle 2. As shown in the drawings, the motor 4 is of the fluid actuated type and has its double acting pistons 5, 5 connected with a crank shaft 6 which extends across the inside of the casing 1, and is journaled therein between the motor 4 and the spindle 2. The valves 7, 7 (Fig. 3) for controlling the inlet and exhaust of motive fluid such as compressed air, to the pistons 5, 5 are actuated by eccentrics on the crank shaft 6 as customary in drill design. The supply and exhaust of the motive fluid to and from the motor 4 is controlled through a throttle valve 8 turnably mounted on a throttle stem or tube 9 which is secured to the motor casing 4, as shown in Fig. 1ª. The outer end of the stem 9 is connected to the motive fluid supply hose (not shown) and the construction of the stem 9 and the valve 8 are such that on turning the valve in opposite directions the flow of motive fluid to and from the motor may be changed as to reverse the action of the motor and thus turn the spindle 2 in opposite directions.

A supplemental crank shaft 10 is journaled within the casing 1 between the spindle 2 and the main crank shaft 6, there being intermeshing gears 11, 12 on the respective shafts to transmit power from the shaft 6 to the shaft 10 in the rotation of the former by the motor 4. A pair of ratchet levers 13, 13 are loosely journaled on the spindle 2 within the casing 1 in side by side relation and each lever has a slot 14 through which the cranks of the driving shaft 10 extend. Blocks 15, 15 are mounted on the cranks of said shaft and work, one in each slot 14, so as to oscillate the levers 13, 13 back and forth in the rotation of the shaft. Each lever carries a pair of pawls 16, 16 which work in recesses 17, 17 in the levers and are forced against the spindle 2 through the open ends of the recesses at the spindle by spring pressed plungers 18, 18 carried by the levers, one for each pawl. The pawls on each lever are reversely arranged so as to alternately engage the teeth 19, 19 on the spindle 2 for turning the spindle in opposite directions.

Arranged between the ratchet levers 13, 13 is a relatively thin flat plate 20 having an opening 21 through which the spindle 2 extends. The plate 20 extends toward the crank shaft 10 and is there provided with a number of gear teeth 22 on opposite sides of which are plain portions forming shoulders 23, 23. The ratchet levers 13, 13 bear against the opposite sides of the plate 20 and are held against the same by shoulders on the outer sides of the levers and carried by the drill case 1. The shoulder for one lever is provided by the inner end of a bearing bushing 24 for the spindle 2 and the shoulder for the other lever is provided by the side of the innermost ring 25 of the thrust bearing for the inner end of said spindle.

Cams 26, 26 in the form of segment strips are arranged on opposite sides of the plate 20 at the pawls 16, 16 and are secured to the plate so as to be moved therewith in the shifting of the plate in opposite directions. The plate 20 is provided with a series of notches 27, 27 to receive lugs 28, 28 on the strips 26 so as to key the strips to the plate and prevent them from having movement relatively thereto. The strips are riveted through the notches 27, and are thus clamped against the opposite sides of the plate. The levers 13, 13 are recessed at 30 on their inner sides to accommodate the strips 26 and allow the levers to work against the sides of the plate 20 and also to bring the strips into position to lift the pawls in the shifting of the plate. The pawls 16, 16 are milled out, as at 31 at their biting ends next the plate 20 so as to provide flat surfaces for the pawls to ride on the strips 26 when lifted thereby out of driving engagement with the teeth 19 on the spindle 2. The recesses 31 also prevent lifting the pawls any more than necessary to clear the teeth of the spindle.

Mounted on and surrounding the center portion 32 of the crank shaft 10 is a device for shifting the cam plate 20. Said device comprises a segment 33 and a retaining strap 34 therefor. The segment has a number of teeth 35 to mesh at the proper time with the teeth 22 on the plate 20. The portion 32 of the shaft 10 is concentric with its end journals so that the segment 33 when moved by the shaft 10 will turn in an arc of a circle thereof. The strap 34 has one end fitting in a recess 36 on the inner side of the segment 33 as shown in Fig. 2. The other end of the strap 34 is turned outward as at 37 through which extends a bolt 38 which is pivotally connected with the adjacent end of the segment 33. 39 is a nut threaded on the bolt 38 and engaging a coiled spring 40 about the bolt between the nut and the end 37 of the strap so as to adjust tension of the spring on the clamp. Blocks 41, 42 of wood or other desired friction material are riveted or otherwise secured to the inner side of the segment 33 and the strap 34, respectively, and are held with sufficient tension against the center portion 32 of the shaft 10 by the spring 40.

The structure shown and described, operates as follows: The motor 4 being reversible, the spindle 2 may be run in opposite directions. This is brought about by turning the throttle valve 8 in the required direction. The segment 33 having frictional engagement with the shaft 10 will turn with the shaft on reversing its direction of rotation and in so doing will shift the cam plate 20 by reason of the mutilated gear connection between them. The movement of both, however, will stop as soon as the approaching ends of the plate 20 and the segment 33 beyond the teeth come together. As soon as this happens, the plate 20 will stop further rotation of the segment 33 with the shaft 10 because the holding power of the plate on the segment is sufficient to overcome the tension of the spring 40 and the shaft 10 will continue to rotate with respect to the segment. On reversing the shaft 10 by reversing the motor 4, the segment will be free of the holding power of the plate, and the segment will turn with the shaft because of the tension of the spring 40 on the segment. The segment will stop as soon as the other approaching ends of the segment and plate come together as described. In shifting the plate 20, the cams 26 thereon will alternately lift the pawls out of driving engagement with the spindle and hold out the lifted pawls during the action of the others on the spindle as indicated in Figs. 4 and 5. The pawls which are held out will have a slight rubbing action on the cams engaged thereby due to the swinging action of the levers 13. The segment 33 requires very little tension on the crank 10 just enough to be shifted. This tension may be adjusted from time to time to compensate for wear on the blocks 41, 42 by tightening up the nut 39 on the spring 40.

By the reversing mechanism described, the intermittent grip devices, as provided by the pawl and lever arrangement can be retained which is much more efficient than an arrangement of gearing which would be very inefficient on account of the compactness of the drill and the small gear which would be placed on the spindle.

The details of structure and arrangement of parts shown and described may be variously changed and modified without departing from the spirit and scope of my invention.

I claim as my invention:

1. In combination in a portable power driven tool, a rotary spindle, a reversible motor, means providing a driving connection from the motor to the spindle, said means including intermittent grip devices for rotating the spindle in opposite directions, and means acting automatically on reversing the motor to change the direction of rotation of the spindle through said grip devices.

2. In combination in a portable power driven tool, a rotary spindle having ratchet teeth, a reversible motor, means providing a driving connection from the motor to the spindle, said means including reversely arranged pawls for rotating the spindle in opposite directions through said teeth, and means acting automatically on reversing the motor for alternately lifting the pawls out of driving engagement with the spindle.

3. In combination in a portable power driven tool, a reversible shaft, a rotary spindle having ratchet teeth, means providing a driving connection from the shaft to the spindle, said means including reversely arranged pawls for rotating the spindle in opposite directions through said teeth, and means influenced by the rotary movement of the shaft on changing its direction of rotation to alternately lift the pawls out of driving engagement with the spindle.

4. In combination in a portable power driven tool, a reversible shaft, a rotary spindle having ratchet teeth, means providing a driving connection from the shaft to the spindle, said means including reversely arranged pawls for rotating the spindle in opposite directions through said teeth, a shiftable plate, means on the plate to alternately lift the pawls out of driving engagement with the spindle on shifting the plate in opposite directions, and means influenced by the rotary movement of the shaft on changing its direction of rotation to shift the plate in opposite directions.

5. In combination in a portable power driven tool, a rotary spindle having ratchet teeth, a reversible shaft, means providing a driving connection between the shaft and the spindle, said means including reversely arranged pawls for rotating the spindle in opposite directions through said teeth, a shiftable plate having teeth, means on the plate to alternately lift the pawls out of driving engagement with said spindle on shifting the plate in opposite directions, a member frictionally engaged with the shaft and having teeth to engage those on the plate to shift the same in opposite directions on changing the direction rotation of the shaft, and coacting means on the member and the plate to stop the movement of the plate and the member upon completing the shifting of the plate.

6. In combination in a portable power driven tool, a rotary spindle having ratchet teeth, a crank shaft, levers journaled at the spindle and oscillated by the cranks of said shaft, reversely arranged pawls carried by the levers for rotating the spindle in opposite directions through said teeth, a shiftable plate between the levers, cam means on the plate for the pawls, said levers having recesses in their inner sides to accommodate said cam means, and means actuated by the shaft on changing its direction of rotatation to shift the plate and cause the cam means thereon to alternately lift the pawls out of driving engagement with the spindle.

7. In combination in a portable power driven tool, a rotary spindle having ratchet teeth, a crank shaft, levers journaled at the spindle and oscillated by the cranks of said shaft, reversely arranged pawls carried by said levers for rotating the spindle in opposite directions through said teeth, a shiftable plate between the levers and having strips to lift the pawls, and means actuated by the shaft on changing its direction of rotation to shift the plate in opposite directions, said pawls having recesses to receive the strips so as to reduce the lifting movement of the pawls to clear the spindle.

8. In combination in a portable power driven tool, a rotary spindle having ratchet teeth, a crank shaft, levers journaled on the spindle and oscillated by the cranks of said shaft, reversely arranged pawls on the levers for rotating the spindle in opposite directions through said teeth, a shiftable plate between the levers, a member frictionally engaged with the shaft and actuated thereby to shift the plate in opposite directions on changing the direction of rotation of said shaft, and means on the plate to alternately lift the pawls out of driving engagement with the spindle in the shifting of the plate, the portion of the shaft engaged by said member being concentric with the rotary axis of the shaft.

9. In combination in a portable power driven tool, a rotary spindle having ratchet teeth, a crank shaft, levers journaled on the spindle and oscillated by the cranks of the shaft, reversely arranged pawls on the levers for rotating the shaft in opposite directions through said teeth, a shiftable plate between the levers, means actuated by the shaft on changing its direction of the rotation to shift the plate in opposite directions, segment strips on the plate to alternately lift the pawls out of driving engagement with the spindle in the shifting of the plate, said plate having notches to receive projections on the segment strips, and means for securing the segment strips together and clamping them against the plate.

10. In combination in a portable power driven tool, a rotary spindle having ratchet teeth, a reversible shaft, means providing a driving connection between the shaft and the spindle, said means including reversely arranged pawls for turning the spindle in opposite directions through said teeth, a shiftable plate for the pawls, a segment member at the shaft and having means to engage the plate for shifting the same upon reversing the direction of the rotation of the shaft, a spring pressed strap engaged with said member for holding it on the shaft, and frictional material secured to the member and the strap and held thereby against the shaft.

11. A close quarter drill, comprising an elongated outer casing, a rotary spindle transversely disposed in the casing and journaled therein at one end, a reversible motor at the opposite end of the casing, means within the casing and providing a driving connection between the motor and the spindle, said means including intermittent grip devices for turning the spindle in opposite directions, and means acting automatically on reversing the motor to change the direction of rotation of the spindle through said grip devices.

12. A close quarter drill, comprising an elongated outer casing, a rotary spindle transversely disposed in the casing and journaled therein at one end, a reversible motor at the other end of the casing, a crank shaft journaled within the casing between the motor and the spindle and parallel to the latter, means providing a driving connection between the motor and the shaft, levers journaled on the spindle and oscillated by the cranks of said shaft, reversely arranged pawls on said levers for rotating the spindle in opposite directions, and means automatically actuated by said shaft on reversing the motor to alternately lift the pawls out of driving engagement with the spindle.

13. In combination in a portable power driven tool, a rotary spindle having ratchet teeth, a crank shaft, levers journaled at the spindle and oscillated by the cranks of said shaft, reversely arranged pawls carried by the levers for rotating the spindle in opposite directions through said teeth, and means influenced by the rotary movement of said shaft on changing its direction of rotation to alternately lift the pawls out of driving engagement with said spindle.

14. In combination in a portable power driven tool, a rotary spindle having ratchet teeth, a crank shaft, levers journaled at the spindle and oscillated by the cranks of said shaft, reversely arranged pawls carried by said levers for rotating the spindle in opposite directions through said teeth, a member frictionally engaged with the shaft and turned therewith on changing the direction of rotation of said shaft, shiftable means shifted by said member as it is turned with the shaft in opposite directions to alternately lift the pawls out of driving engagement with said spindle, and means for limiting the movement of the member and the shiftable means upon completing the shifting of the latter.

15. In combination in a portable power driven tool, a rotary spindle having ratchet teeth, a crank shaft, levers journaled at the spindle and oscillated by the cranks of said shaft, reversely arranged pawls carried by said levers for rotating the spindle in opposite directions through said teeth, a member frictionally engaged with the shaft and turned therewith on changing the direction of rotation of said shaft, means shifted by said member as it is turned with said shaft for alternately lifting the pawls out of driving engagement with the spindle, and means for adjusting the tension of said member on said shaft.

In testimony whereof I affix my signature.

REINHOLD A. NORLING.